(12) United States Patent
Jung et al.

(10) Patent No.: US 8,698,753 B2
(45) Date of Patent: Apr. 15, 2014

(54) VIRTUAL OPTICAL INPUT DEVICE WITH FEEDBACK AND METHOD OF CONTROLLING THE SAME

(75) Inventors: Yung Woo Jung, Seoul (KR); Yun Sup Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 942 days.

(21) Appl. No.: 12/365,653

(22) Filed: Feb. 4, 2009

(65) Prior Publication Data

US 2009/0219251 A1      Sep. 3, 2009

(30) Foreign Application Priority Data

Feb. 28, 2008  (KR) .................. 10-2008-0018233

(51) Int. Cl.
*G06F 3/02* (2006.01)

(52) U.S. Cl.
USPC .................................................... 345/170

(58) Field of Classification Search
USPC ............................. 345/170; 382/174
See application file for complete search history.

(56) References Cited

U.S. PATENT DOCUMENTS

| | | | |
|---|---|---|---|
| 5,767,842 A * | 6/1998 | Korth | 345/168 |
| 6,614,422 B1 * | 9/2003 | Rafii et al. | 345/168 |
| 7,453,439 B1 * | 11/2008 | Kushler et al. | 345/168 |
| 7,670,006 B2 * | 3/2010 | Lieberman | 353/70 |
| 2003/0132921 A1 * | 7/2003 | Torunoglu et al. | 345/173 |
| 2006/0101349 A1 * | 5/2006 | Lieberman et al. | 715/773 |
| 2007/0222760 A1 * | 9/2007 | Lieberman et al. | 345/168 |
| 2008/0122796 A1 * | 5/2008 | Jobs et al. | 345/173 |

FOREIGN PATENT DOCUMENTS

| | | |
|---|---|---|
| EP | 0 554 492 A1 | 8/1993 |
| WO | WO-01/59975 A2 | 8/2001 |
| WO | WO-2005/091125 A2 | 9/2005 |
| WO | WO-2006/025872 A2 | 3/2006 |

* cited by examiner

*Primary Examiner* — William Boddie
*Assistant Examiner* — Towfiq Elahi
(74) *Attorney, Agent, or Firm* — Birch, Stewart, Kolasch & Birch, LLP

(57) ABSTRACT

Provided are a virtual optical input device capable of providing feedback and a method of controlling the same. In the method, a portion of an input means such as a finger, and a portion of a shadow of the input means generated by a light source are detected through image processing. Physical variations formed between them are used to detect the touch contact of the input means, calculate the position and motion of the input means, and provide the corresponding feedback.

22 Claims, 13 Drawing Sheets

VIRTUAL OPTICAL INPUT DEVICE WITH FEEDBACK AND METHOD OF CONTROLLING THE SAME

CROSS-REFERENCE TO RELATED APPLICATIONS

The present application claims priority under 35 U.S.C. 119 and 35 U.S.C. 365 to Korean Patent Application No. 10-2008-0018233 (filed on Feb. 28, 2008), which is hereby incorporated by reference in its entirety.

BACKGROUND

The present disclosure relates to a virtual optical input device and a method of controlling the same.

With recent development of semiconductor technology, an information communication apparatus has made much progress. Also, due to an information transmitting method of the information communication apparatus, an intuitive and efficient information transmitting method through characters and position information has increased in related art information communication apparatuses that have depended on simple voice signal transmission.

However, since input/output units of the information communication apparatus should be directly manipulated or recognized by a user, there is a limit in miniaturization and mobility.

Examples of an input device of a traditional information communication apparatus include a microphone for voice signals, a keyboard for inputting a specific key, and a mouse for inputting position input information.

Particularly, the keyboard and mouse is an optimized system for efficiently inputting characters or position information. However, since these units are poor in portability or mobility, substitutive devices are under development.

Various units such as a touchscreen, a touchpad, a pointing stick, and a simplified keyboard arrangement are being studied as the substitutive devices, but these devices have a limitation in operability and recognition.

SUMMARY

Embodiments provide a virtual optical input device that makes possible miniaturization of a structure and low power consumption so that it can be mounted inside a mobile communication apparatus, and that is not limited in flatness in a virtual optical input space, and a method of controlling the same.

In one embodiment, a method of controlling a virtual input device includes: forming a virtual input pattern for detection of user input; determining the contact or movement of an input means on the virtual input pattern; and providing a feedback corresponding to the contact point.

In another embodiment, a virtual input device includes: a user input detector generating a virtual input pattern for detection of user input and detecting the movement of an input means on the virtual input pattern; a feedback provider providing a feedback corresponding to the contact or movement of a portion of the input means; and a controller executing, when a portion of the input means contacts the virtual input pattern, a command corresponding to the contact point and controlling an image processor so that the feedback provider provides the feedback.

In further another embodiment, a mobile device includes: a wireless communication unit performing wireless communication with a wireless communication system or another mobile device; a user input detector generating a virtual input pattern for detection of user input and detecting the movement of an input means of the user; a feedback provider providing a feedback corresponding to the contact or movement of a portion of the input means; a display unit displaying information; a memory unit storing the input pattern and the corresponding command; and a control unit controlling the operations of the above components.

According to the present invention, a miniaturized virtual optical input device can be realized.

Also, according to the present invention, the number of parts used inside can be minimized, so that a virtual optical input device of low power consumption can be realized.

Also, according to the present invention, character inputting with excellent operability and convenience can be realized.

Also, according to the present invention, since the size of a virtual input space is not limited, the virtual input space can be variously used.

Also, since low power consumption and miniaturization are possible, a character input method of a mobile information communication apparatus can be developed remarkably.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1A:
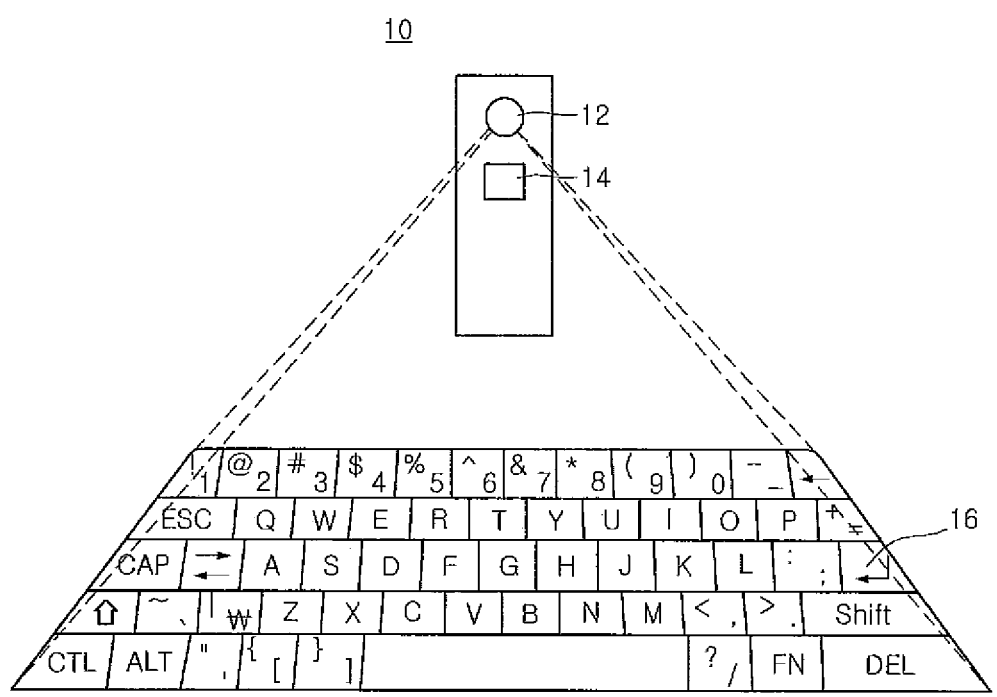
FIGS. 1A and 1B are respectively a front view and a side view of a virtual optical input device according to an exemplary embodiment.
Figure 1B:
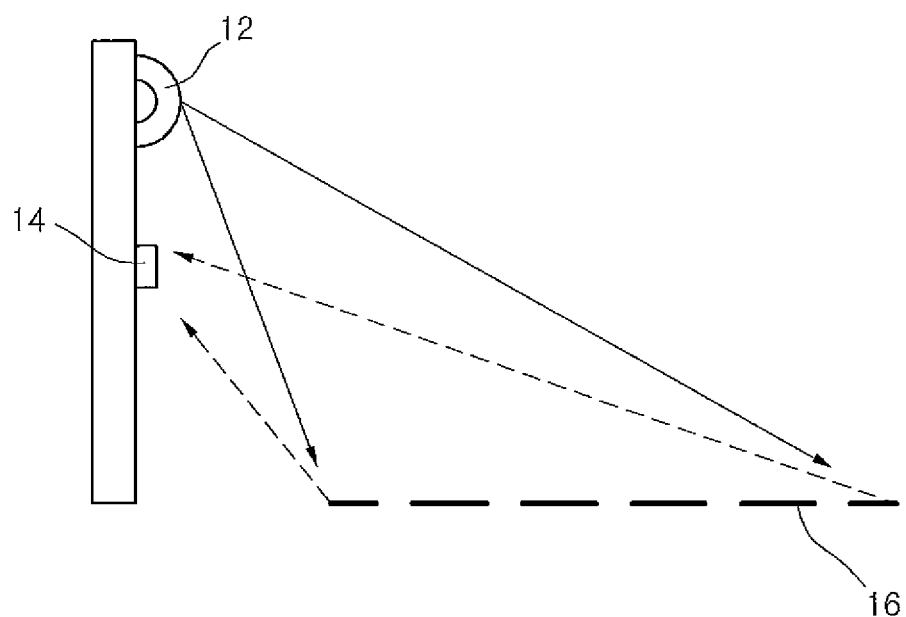

FIGS. 1A and 1B are respectively a front view and a side view of a virtual optical input device 10 according to an exemplary embodiment.

Referring to FIGS. 1A and 1B, when light formed in a shape of a predetermined pattern is emitted from an optical input pattern generator 12, a virtual optical input pattern 16 is generated on a bottom. The bottom is a plane forming an optical input pattern, which may be a plane such as a palm. Though FIG. 1 exemplarily illustrates that a keyboard-shaped input pattern is formed, the present disclosure is not limited thereto but includes various types of input patterns that can replace a mouse and a touchpad.

Also, an input means in the specification includes all the devices used for performing a predetermined input operation using the virtual optical input device. Generally, the input means includes a human finger and may include other objects such as a stylus pen depending on embodiments.

Also, an image receiver 14 is separated by a predetermined distance below the optical input pattern generator 12. The image receiver 14 captures the virtual optical input pattern, the input means, and a shadow image corresponding to the input means.

The image receiver 14 may be disposed below the optical input pattern generator 12 so that an image excluding an image to be captured, that is, an image corresponding to a noise is not captured.

The image receiver 14 should have a suitable frame rate in order to capture the movement of the input means and determine whether the input means contacts or not. For example, the image receiver 14 may have a rate of about 60 frames/sec.

An image captured by the image receiver 14 is identified as the virtual input pattern, the input means, and the shadow image by an image processor (not shown). The image processor detects the positions of the input means and the shadow and executes a command corresponding to a contact point of the input means.

A method of identifying, by the image processor, each object from the received image, and a method of determining, by the image processor, whether the input means contacts will be described later.

Figure 2:
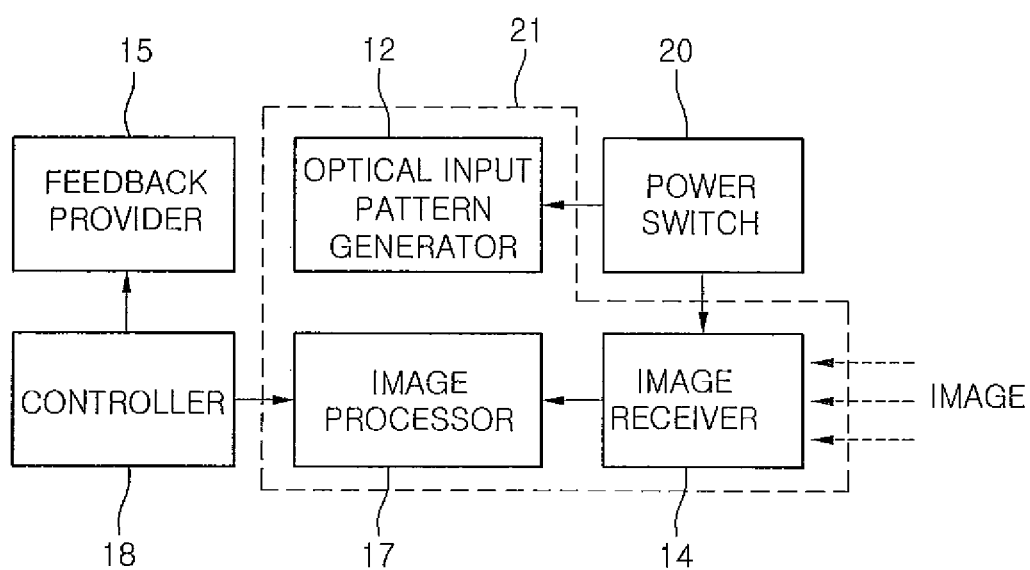
FIG. 2 is a block diagram of a virtual optical input device according to an exemplary embodiment.

FIG. 2 is a block diagram of a virtual optical input device according to an exemplary embodiment.

Referring to FIG. 2, the virtual optical input device includes an optical input pattern generator 12, an image receiver 14, an image processor 17, a feedback provider 15, and a controller 18. The optical input pattern generator 12 generates a virtual optical input pattern. The image receiver 14 captures the input pattern generated by the optical input pattern generator 12, a portion of an input means, and a shadow image corresponding to the portion of the input means. The image processor 17 detects a position related with the portion of the input means and the portion of the shadow image from the image received by the image receiver 14, and executes a command corresponding to a contact point in the portion of the input means. The feedback provider 15 provides a feedback corresponding to the contact or motion of a portion of the input means. The controller 18 controls the image processor 17 to execute the command corresponding to the contact point when the portion of the input means contacts the virtual input pattern.

According to an exemplary embodiment, a power switch 20 may be further provided to control the power of the above devices suitably according to use environments in order to efficiently control the power of the image receiver 14 and a light source in the optical input pattern generator 12 that is highest in power consumption.

Figure 3A:
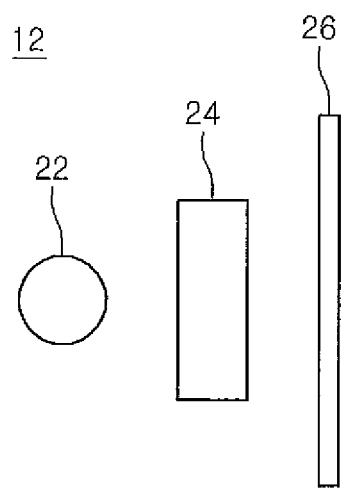
FIGS. 3A and 3B are schematic views illustrating the structure of an optical input pattern generator according to exemplary embodiments.
Figure 3B:
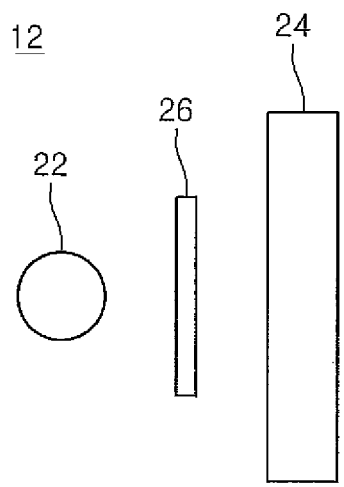

FIGS. 3A and 3B illustrate the structures of the optical input pattern generator 12 according to exemplary embodiments.

According to an exemplary embodiment, as illustrated in FIG. 3A, the optical input pattern generator 12 may include a light source 22, a lens 24 condensing light emitted from the light source 22, and a filter 26 passing light outputted from the lens 24 and having a pattern forming the optical input pattern.

According to another exemplary embodiment, as illustrated in FIG. 3B, the filter 26 may be disposed between the light source 22 and the lens 24 to generate a virtual optical input pattern.

Examples of the light source 22 include various kinds of light sources such as a laser diode (LD) and a light emitting diode (LED). Light emitted from the light source 22 passes through the lens 24 and the filter 26 to generate a specific pattern in a virtual character input space. The light source 22 is configured to emit light having intensity that can be visually perceived by a user.

According to an exemplary embodiment, the light source 22 may be divided into a generation light source generating a visible light pattern that can be perceived by a user, and a detection light source generating invisible light for detecting a contact of the input means. The generation light source provides a pattern image to be shown to the user, and the invisible light generates a shadow for input detection.

The lens 24 may be a collimate lens and allows light incident thereto to be visually perceived by a user and magnifies, corrects, and reproduces in a size that can be sufficiently used by the input means.

The filter 26 is a thin film type filter and includes a pattern corresponding to a virtual optical input pattern to be formed.

According to an exemplary embodiment, a spatial light modulator or a plurality of filters may be used instead of the filter 26 in order to change a pattern to be formed.

The image receiver 14 captures and receives a virtual optical input pattern generated by the optical input pattern generator 12, a portion of the input means, and a shadow corresponding to the portion of the input means.

The image receiver 14 may be realized using a camera module and may further include a lens at the front end of the image receiver 14 in order to allow an image to be formed on a photosensitive sensor inside the camera module. A complementary metal oxide semiconductor (CMOS) type photosensitive sensor may control a shooting speed depending on a shooting size. When the CMOS type photosensitive sensor is driven in a low resolution mode at a level that allows shooting of a human finger operation or speed, information required for implementing the present disclosure can be obtained.

The image processor 17 identifies the virtual optical input pattern, a portion of the input means, and a corresponding shadow image from an image received by the image receiver 14, and detects the positions of the portions of the input means and the shadow thereof or positions related thereto to execute a command corresponding to a contact point in the portion of the input means.

Also, when determining that the portion of the input means contacts the virtual optical input pattern, the controller 18 controls the image processor 17 to execute the command corresponding to the contact point.

Therefore, since a virtual optical input device can be realized using even a small number of parts, the input device can be miniaturized.

The feedback provider 15 provides a feedback in response to the motion of the input means. For example, the feedback provider 15 may provide various types of feedbacks so that the user can detect the motion of the input means. The feedback provider 15 may display a moving image on the bottom in response to the motion of the input means. The feedback provider 15 may be an imaging device such as a projector. Examples of the projector include a DLP-type projector, an LCD-type projector, an LCos-type projector, and a scanning-type projector.

Figure 4A:
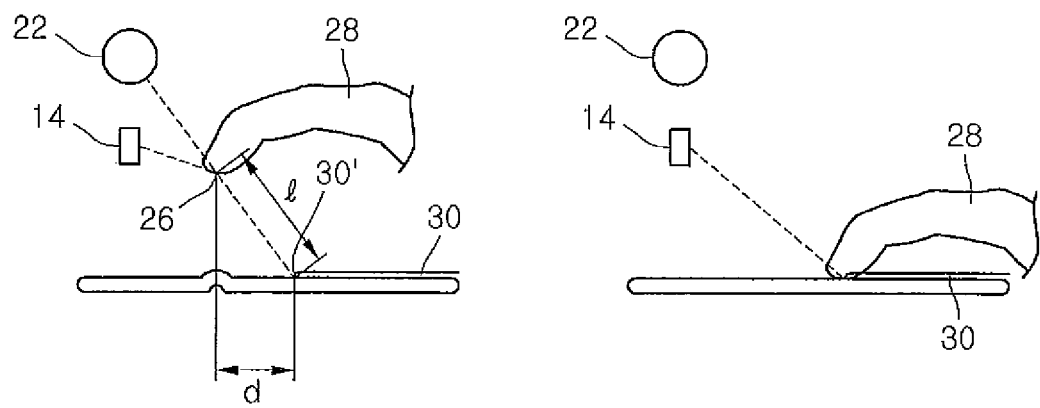
FIGS. 4A and 4B are views illustrating methods of determining whether a virtual optical input device contacts or not according to exemplary embodiments.
Figure 4B:
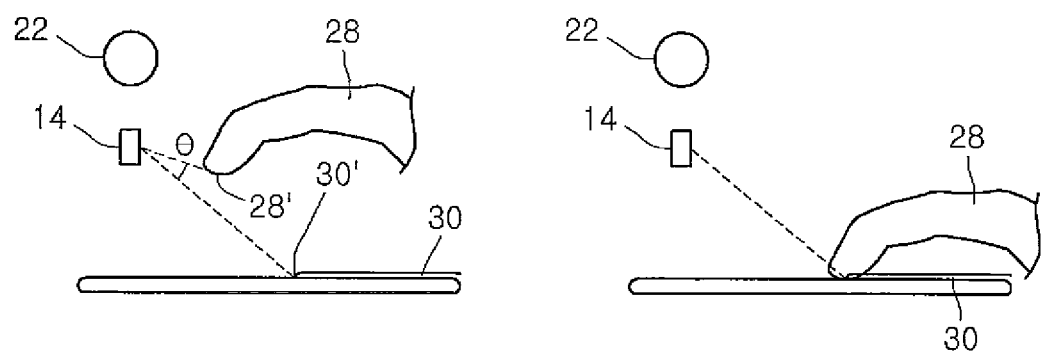

FIGS. 4A and 4B are views illustrating methods of determining the contact or not of a virtual optical input device by a user input unit according to exemplary embodiments.

An virtual optical input device according to an exemplary embodiment generates an input pattern image for input detection, captures an image of an input means and an image of its shadow, and detects a physical variation between the input means and its shadow, thereby determining the contact and the contact position of the input means. The input pattern image provides an input interface to the user and also generates a shadow of the input means. As described above, the generation light source for providing an input interface and the detection light source for generating a shadow may be used in a separate manner.

FIG. 4A is a view illustrating a method of determining whether the input means 28 contacts a bottom using a distance difference between a portion of the input means 28 and a shadow 30 generated by the portion of the input means 28. FIG. 4B is a view illustrating a method of determining whether the input means 28 contacts a bottom using an angle difference θ between the portion of the input means 28 and the shadow 30 generated by the portion of the input means 28.

The light source 22 is included in the optical input pattern generator 12 of FIG. 2, 3A or 3B. The lens 24 or the filter 26 of the optical input pattern generator 12 is omitted in FIGS. 4A and 4B for simplicity in description. The image receiver 14 separated by a predetermined distance below the optical input pattern generator 12 (i.e., the light source 22) captures an input pattern, an image of the input means 28, and a corresponding shadow image 30. Next, the image processor (not shown) identifies the input detection pattern, a portion of the input means 28, and the corresponding shadow image 30 from the image received by the image receiver 14, and determines the positions of respective objects.

According to an exemplary embodiment, the image processor may determine whether the input means 28 contacts the bottom by detecting the portion of the input means 28 and the portion of the corresponding shadow 30, or the positions related thereto.

For example, the image processor may continuously detect the position of the end 28' of the input means 28 and the position of the end 30' of the shadow 30 from the received image.

According to an exemplary embodiment, the image processor may detect the position of a finger knuckle of the input means 28 or the shadow 30 in order to determine a contact of the input means 28.

Also, according to an exemplary embodiment, positions offset by a predetermined distance from the ends 28' and 30' of the input means 28 and the shadow 30 may be detected and used for determining a contact of the input means 28.

Also, according to the present disclosure, whether the input means 28 contacts or sufficiently comes close to the bottom may be determined on the basis of an arbitrary variable changing as the input means 28 comes close to the bottom such as angle relation, a relative velocity, or a relative acceleration besides distance relation between positions related with the portion of the input means 28 and the shadow 30 thereof.

Though a case of using position information of the end 28' of the input means 28 and the end 30' of the shadow 30 has been described in the specification, the above-described various reference values may be used in order to determine whether the input means contacts or sufficiently comes close to the bottom.

Since technology of identifying an object from a captured image is well known to those of ordinary skill in the art, detailed description thereof is omitted.

Also, since technology of identifying an object from an image captured through image processing and finding out a boundary line using a brightness difference between adjacent pixels is also well known to and widely used by those of ordinary skill in the art, descriptions of image processing methods required for calculating the positions of a portion of the input means 28 and the portion of the shadow image 30, or positions related thereto are omitted.

As illustrated in FIG. 4A, a distance difference between the end 28' of the input means 28 and the end 30' of the shadow 30, or a distance difference between positions related with the input means 28 and the shadow 30 is continuously calculated. When the calculated distance difference is 0, it may be determined that the input means 28 contacts the bottom. According to on an exemplary embodiment, when the calculated distance difference becomes a predetermined threshold value or less, it may be determined that the input means 28 contacts the bottom.

At this point, even in a case of detecting another portion related with the input means 28 or the shadow 30 instead of the ends 28' and 30' of the input means 28 or the shadow 30, a point when a distance between other portions related with the input means 28 or the shadow 30 is 0 or a predetermined threshold value or less may be detected.

Also, according to an exemplary embodiment, even in the case where the input means 28 does not actually contact the bottom, when the input means 28 comes close within a predetermined distance from the bottom, it may be determined that the input means contacts the bottom.

The distance may be determined using a straight line distance l between the end 28' of the input means 28 and the end 30' of the shadow, or using a horizontal distance d between a projected position of the bottom corresponding to the input means end 28' up to the shadow end 30'.

According to another exemplary embodiment, as illustrated in FIG. 4B, an angle θ between the input means end 28' and the shadow end 30' may be calculated to determine a contact of the input means 28. According to another exemplary embodiment, the contact of the input means may be determined on the basis of an angle between portions related with the input means 28 and the shadow 30.

As illustrated in the left portions of FIGS. 4A and 4B, when the input means 28 does not contact a space of a plane of the virtual optical input device, the distance l or d between the input means end 28' and the shadow end 30' has a non-zero value, or the angle θ between the input means end 28' and the shadow end 30' has a non-zero value.

However, when the input means 28 contacts the space of the plane of the virtual optical input device, the above values l, d, and θ become zero, and thus it may be determined that the input means 28 has contacted the plane.

As described above, according to an exemplary embodiment, when the above values l, d, and θ become a predetermined threshold value or less, it may be determined that the input means 28 contacts the plane.

As described above, when the input means 28 comes close within a predetermined distance to the plane though a contact does not actually occur, the input means may be determined to contact the plane and a subsequent process may be performed.

When a contact occurs, plane coordinates corresponding to a contact point may be calculated through image processing with reference to an image captured by the image receiver. When the controller orders a command corresponding to the coordinates of the contact point to be executed, the image processor executes the command.

According to an exemplary embodiment, as a reference for determining a contact of the input means 28, the relative velocities and accelerations of the input means end 28' and the shadow end 30' may be used.

For example, when the relative velocities of the input means end 28' and the shadow end 30' are zero, it may be determined that the positions of the two objects are fixed. Assuming that a direction in which the input means end 28' and the shadow end 30' come close is a (+) direction, and a direction in which the input means end 28' and the shadow end 30' go away is a (−) direction, when the relative velocity has a (+) value, it may be determined that the input means 28 comes close. On the other hand, when the relative velocity has a (−) value, it may be determined that the input means 28 goes away.

That is, a relative velocity is calculated from continuously shot images over continuous time information. When the relative velocity changes from a (+) value to a (−) value in an instant, it is determined that a contact occurs. Also, when the relative velocity has a constant value, it is determined that a contact occurs.

Also, acceleration information is continuously calculated, and when a (−) acceleration occurs in an instant, it is determined that a contact occurs.

As described above, relative velocity information or acceleration information of other portions of the input means 28 and the shadow 30 or other positions related thereto may be calculated and used.

To realize a computer algorithm on the basis of the above-described technology, continuous time information (that is, continuous shot images) is required. For this purpose, a structure that can constantly store and perform an operation on extracted information may be provided.

Therefore, for this purpose, image processing of an image received by the image receiver 14 is required. For example, images can be extracted over three continuous times $t_0$, $t_1$, and $t_2$, and a velocity or acceleration can be calculated on the basis of the extracted images. Also, the continuous times $t_0$, $t_1$, and $t_2$ may be constant intervals.

Determining a contact of the input means 28 using the velocity information and the acceleration information can be used as a method of complementing a case where calculation and use of the distance information or the angle information are not easy.

As described above, according to the present disclosure, the input means 28 and the shadow 30 are identified from a captured entire image, so that positions thereof can be calculated. However, to identify each object from the captured entire image, a huge amount of operations are required and so a time may be delayed in identifying the images.

In a virtual optical input device according to an exemplary embodiment, an input detector 21 generates a pattern image for input detection by use of a method described with reference to FIGS. 4A and 4B, and detects the motion of the input means of the user. Also, the feedback provider 15 provides the user with various feedbacks corresponding to the detected motion.

The input detector 21 needs a light source to output a pattern image, and the feedback provider 15 also needs a light source. The feedback provider 15 may share a light source with the input detector 21, or may use a separate light source.

Figure 5:
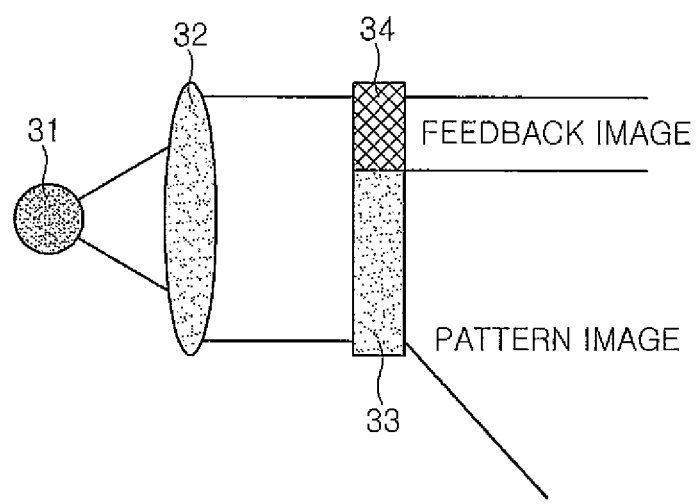
FIG. 5 illustrates a method of measuring the positions of an input means and a shadow more simply according to an exemplary embodiment.

FIG. 5 illustrates an exemplary embodiment that uses a single light source for both of the input detector 21 and the feedback provider 15.

As illustrated in FIG. 5, light emitted from a light source 31 is inputted through a lens 32 to a projector 34 and a filter 33.

The light inputted to the projector 34 provides a feedback image according to the motion of an input means detected by the input detector 21. The light inputted to the filter 33 provides a pattern image for input detection.

According to an exemplary embodiment, the projector 34 and the input detector 21 may be separate devices that use separate light sources.

Also, according to an exemplary embodiment, the optical input pattern generator 12 of the input detector 21 may be omitted and the feedback provider 15, that is, the projector 34 may be configured to output the input-detection pattern image together with the feedback image. The projector 34 may display the feedback image and the input-detection pattern image on separate regions or in an overlapping fashion. The input-detection pattern image is substantially a still pattern image, and the feedback image is a changeable image.

FIGS. 6A to 7H illustrate a variety of feedback providing methods according to exemplary embodiments.

Figure 6A:
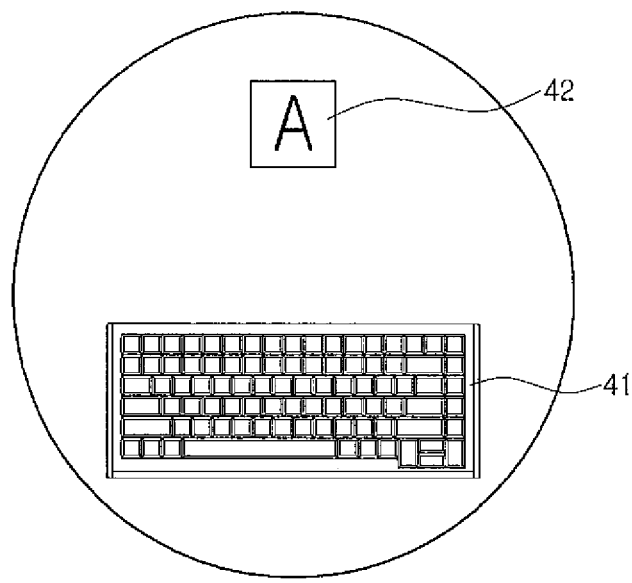
FIGS. 6A to 7H illustrate a variety of feedback providing methods according to exemplary embodiments.

As illustrated in FIG. 6A, a region of the bottom is set as an input region 41, on which a virtual optical pattern (e.g., a keyboard pattern) for input detection is formed. Another region of the bottom is set as a feedback region 42 to display a feedback image. The optical input pattern generator 12 of FIG. 2 forms an input pattern in the input region 41, and the feedback provider 15 forms a feedback image in the feedback region 42.

If a user touches an alphabet 'A' in the keyboard pattern, the input detector 21 detects the touch point by use of received information and transmits a signal corresponding to 'A' to the projector 34, so that a shape 'A' is displayed on the feedback region 42. The user inputs a command on the bottom, and receives a feedback about the inputted command from the bottom. According to this configuration, the user can use the bottom as a touchscreen.

Figure 6B:
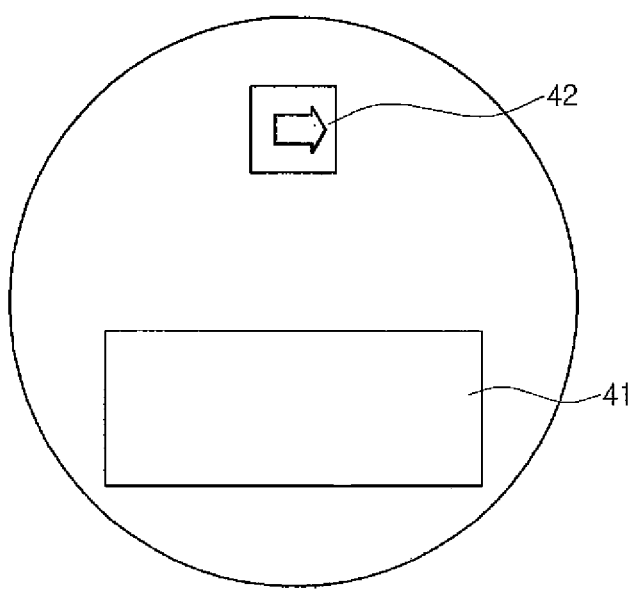

As illustrated in FIG. 6B, if the user makes a motion in a specific direction in a virtual optical pattern (e.g., like a touch-pad) for position information input in the input region 41, a shape (such as an arrow) indicating the motion direction is displayed on the feedback region 42, through the same process as above. The user can get feedback information about the motion direction of the input means.

FIGS. 7A to 7H illustrate exemplary embodiments in which the input region 41 and the feedback region 42 overlap each other. In this case, it is preferable that one projector provides both an input pattern image and a feedback image. That is, it is preferable that one projector forms a still virtual input pattern to detect an input and provides a feedback according to the input.

Figure 7A:
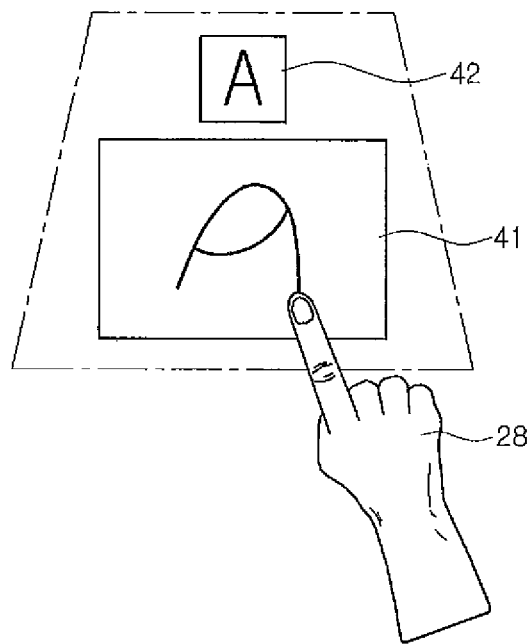

FIG. 7A illustrates implementation of an optical feedback in generation of character or image input information based on the position and motion information of an input means 28.

When the user writes characters on the input region 41 by use of the input means 28, the input detector detects the characters by detecting the position and motion of the input means 28. The detected characters are displayed on the feedback region 42. Also, the trace of a pattern drawn by the user is displayed on the input region 41. In this case, the input region 41 serves as both an input region and a feedback region.

Figure 7B:
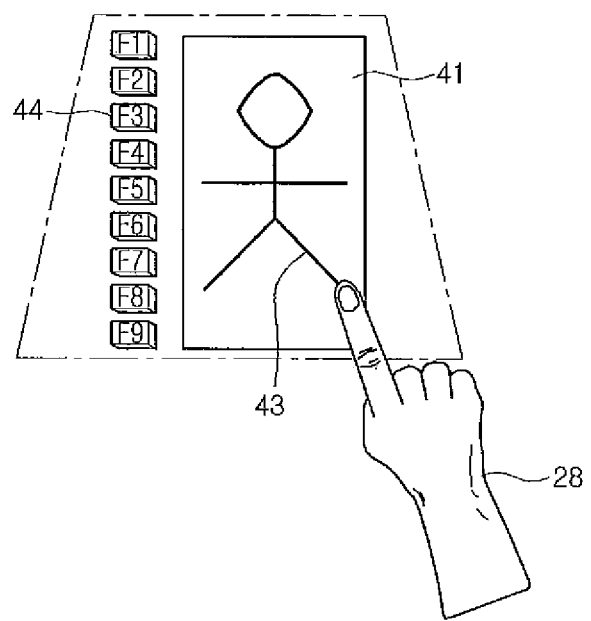

The user draws a desired pattern or FIG. 43 in the input region 41 as illustrated in FIG. 7B. The position and motion of the input means 28 are detected to display the pattern or figure drawn in the input region 41. In this case, the feedback region overlaps with the input region 41. By the configurations of FIGS. 7A and 7B, the bottom can be used to achieve the same effect as inputting a pattern by use of a touchscreen.

According to an exemplary embodiment, function keys 4 are displayed on a side region of the bottom. The function keys 44 are given respective functions such as selection of the thickness, color and type of a line, so that it is possible to change the line thickness, color and type of a pattern 43 provided as a feedback when the user draws a pattern.

Figure 7C:
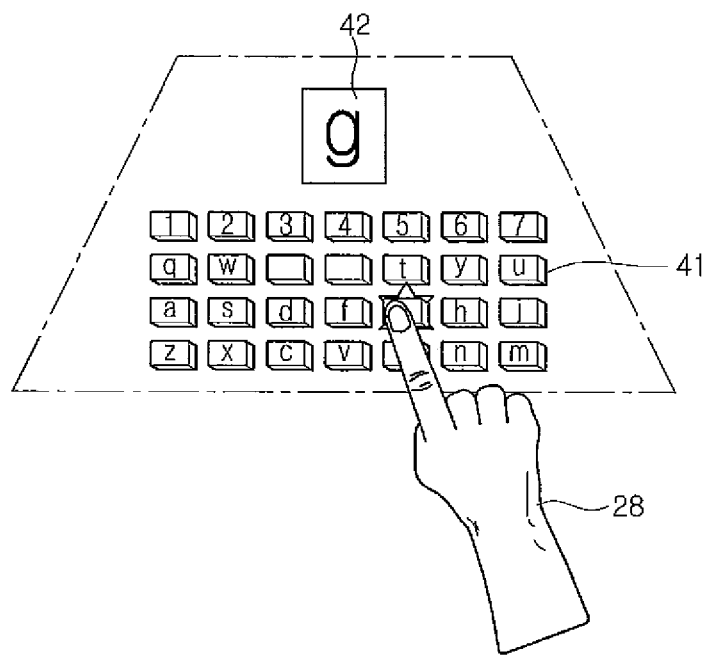

As illustrated in FIG. 7C, in the input pattern 41 based on character input such as a keyboard, information about keys pressed by the user is provided as a feedback. The effect of pressing each key provides a feedback about key input in various shapes such as the scattering effect of light, glittering, or the shape of a 3D key being pressed.

A predetermined space is set to display a currently inputted character (or a portion of a character string), so that the user can directly confirm his own input without moving his eyes.

For example, as illustrated in FIG. 7C, if the user touches a key 'g', a shape 'g' is displayed on the feedback region 42. Alternatively, a scattering light is provided to or around the key 'g' to indicate the pressing of the key 'g'.

Figure 7D:
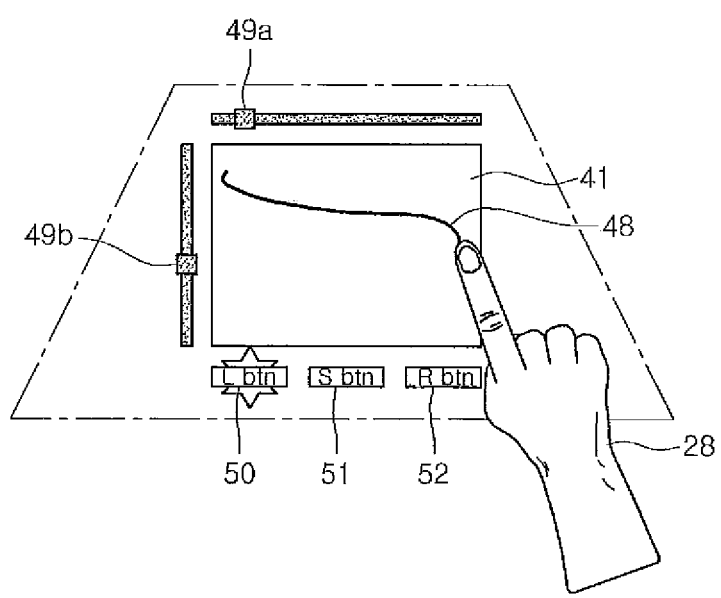

Referring to FIG. 7D, scrollbars 49a and 49b of x/y axes are provided around the input region 41. When the user draws a pattern on the input region 41, the scrollbars 49a and 29b move to the current position of the input means 28 to indicate the position of the input region 41. The input region 41 matches with other display than the bottom, for example, a monitor screen or a TV screen. The scrollbars 49a and 49b helps to detect the location of the input means 29 in a main display (such as LCD monitor or a TV), not an image displayed on the bottom.

According to an exemplary embodiment, the configuration of FIG. 7D is used as a device having a similar function to a touchpad used in a notebook computer. In this case, Left/Right click buttons 51 and 52 corresponding to Left/Right click buttons of a touchpad may be additionally displayed on one side of the input region 41. When the user moves the input means on a window of the input region 41, a cursor moves; and when the buttons 51 and 52 are touched, a command of the corresponding position is executed. Also, a scroll button 51 used in a PC wheel mouse may be additionally displayed.

Figure 7E:
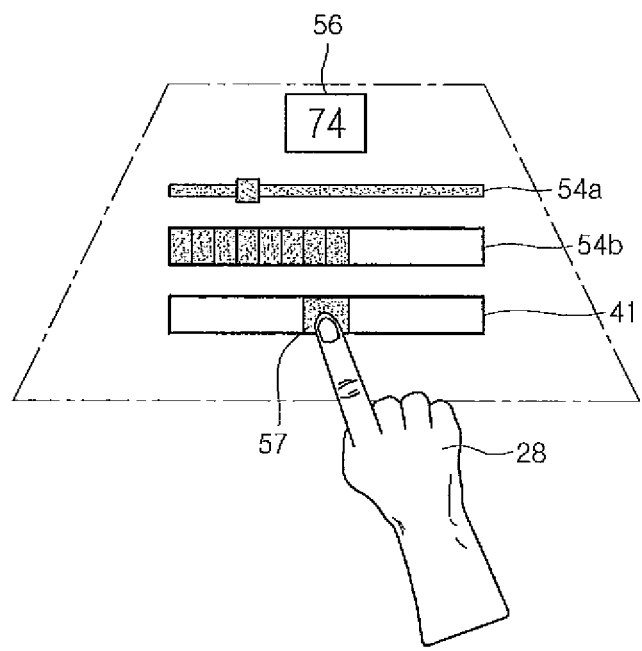

FIG. 7E illustrates an exemplary embodiment that can be used as various control panels of, for example, volume, monitor contrast, contrast ratio, and equalizer control.

For example, for control of the volume of an electronic device, a bar-type scrollbar is displayed on the input region 41 of the bottom. When the input means 28 moves right and left on the input region 41, the strength of volume is controlled. Herein, a scrollbar 57 moves according to the movement of the input means 28. Also, the strength of volume may be represented by a number 56 or various scrollbars 54a and 54b.

The embodiment of FIG. 7E can implement the feedback provider 15 and the optical input pattern generator 12 of FIG. 2 by use of one projector.

Figure 7F:
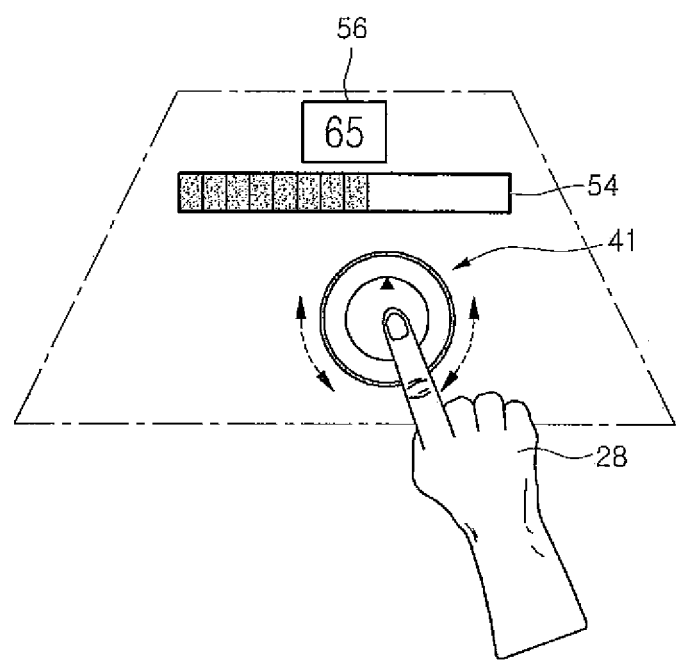

FIG. 7F illustrates an example of a rotary control interface (such as a jog dial) on the bottom according to an exemplary embodiment. A jog dial is displayed on the input region 41 of the bottom, so that the user can use it as a control panel. When the user touches and rotates the displayed jog dial, volume or monitor setting values are changed accordingly. The changed values are represented by a number 56 or a scrollbar 54.

Figure 7G:
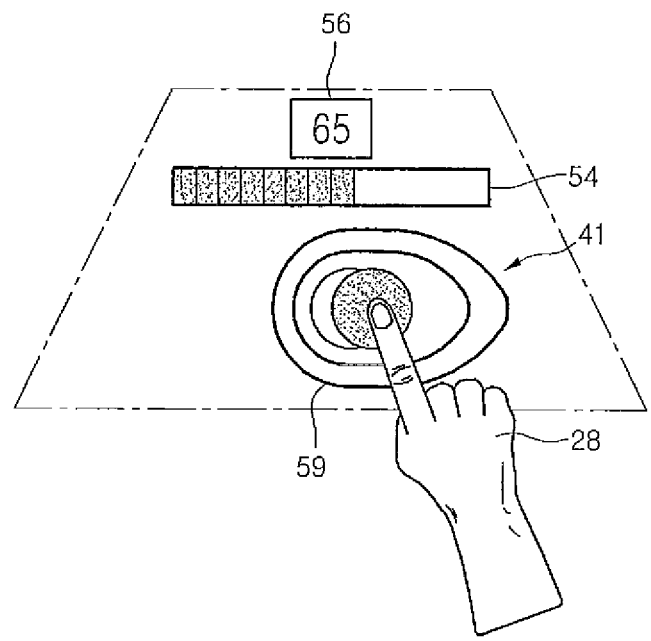
Figure 7H:
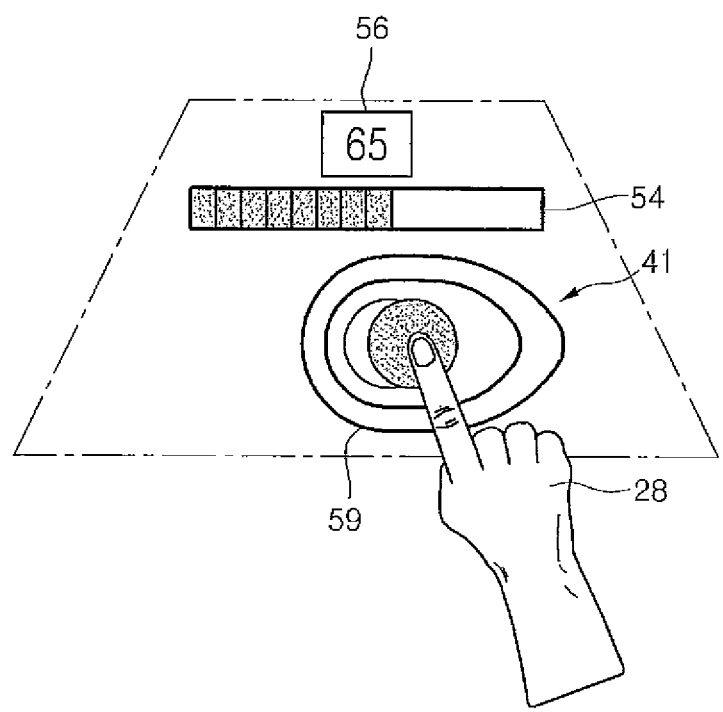

FIGS. 7G and 7H illustrate exemplary embodiments of a rotary control interface that can provide a feedback about the moving direction and distance of the input means 28.

Referring to FIG. 7G, a panel 55 with radiative type arrows therearound may be displayed on the input region 41. When the user moves the input means 28 from the center in a direction, an arrow corresponding to the direction is displayed in highlight by color and brightness. The panel 55 may also be moved in the moving direction of the input means 28.

A number 56 or a scrollbar 54 may be displayed on other region of the bottom to indicate the moving distance of the input means 28 from the center of the panel 55.

Referring to FIG. 7H, contours 59 may be displayed on the input region 41. When the input means 28 moves, the contours 59 are displayed in such a way that they are protruded and distorted in the moving direction of the input means 28.

A number 56 or a scrollbar 54 may be displayed on other region of the bottom to indicate the moving distance of the input means 28 from the center of the panel 55.

As described above, the feedback provided in the virtual optical input device can be represented visually. According to other embodiments, the feedback may be provided in various types such as sound and vibration.

For example, an actuator capable of transmitting force and vibration to the user are provided to transmit a feedback of force and vibration to the user, thereby achieving the reality of the virtual optical input device. Also, when the user presses a keybutton or draws a pattern, a speaker may be used to provide a feedback of the corresponding sound.

The virtual input unit according to embodiments can be applied to various types of mobile devices and non-mobile devices. Examples of the mobile devices include cellular phones, smart phones, notebook computers, digital broadcasting terminals, personal digital assistants (PDAs), portable multimedia players (PMPs), and navigators.

Figure 8:
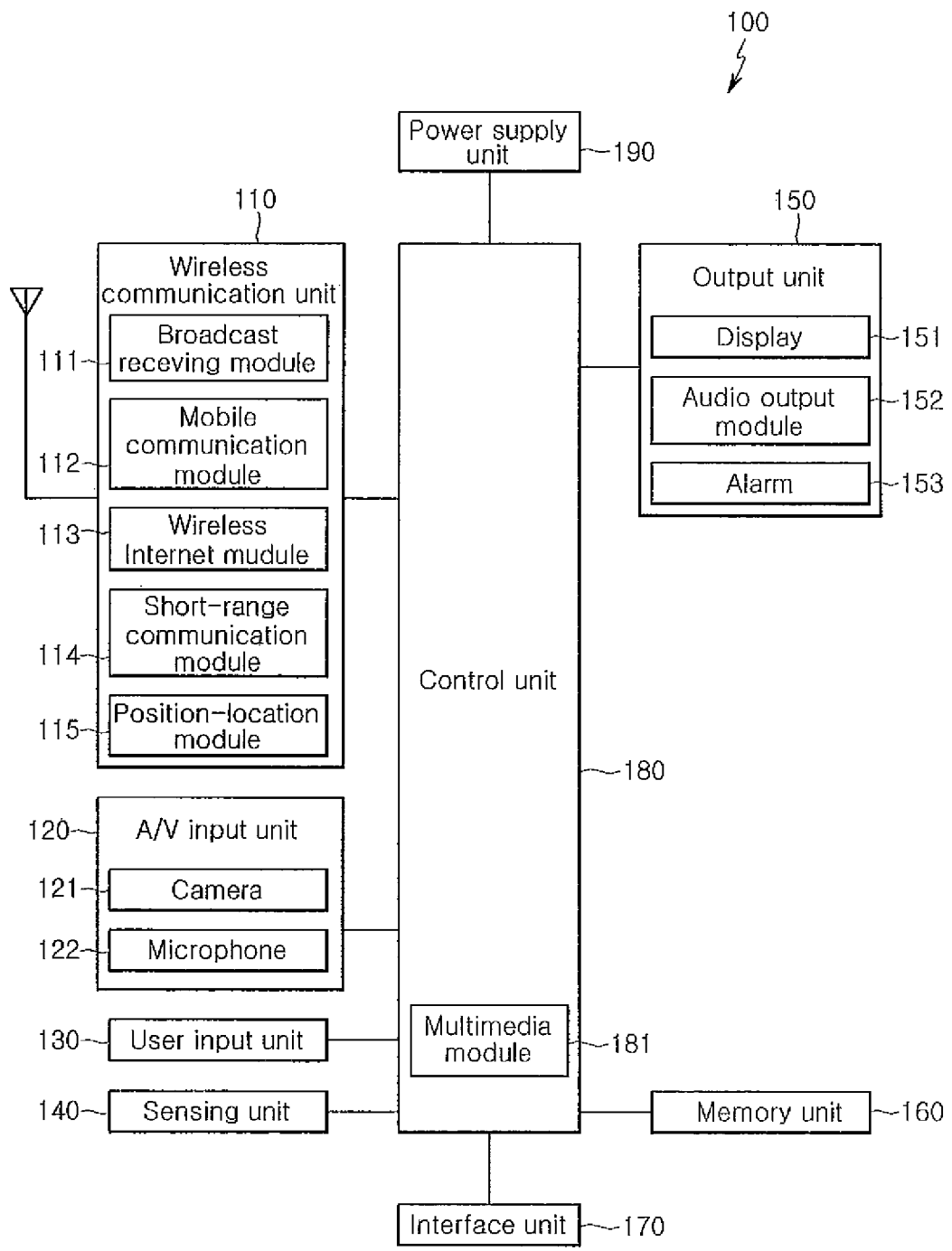
FIG. 8 is a block diagram of a mobile device according to an exemplary embodiment.

FIG. 8 is a block diagram of a mobile device 100 according to an exemplary embodiment. The mobile device may be implemented using a variety of different types of devices. Examples of such devices include mobile phones, user equipment, smart phones, computers, digital broadcast devices, personal digital assistants, portable multimedia players (PMP) and navigators. By way of non-limiting example only, further description will be with regard to a mobile device. However, such teachings apply equally to other types of devices. FIG. 8 shows the mobile device 100 having various components, but it is understood that implementing all of the illustrated components is not a requirement. Greater or fewer components may alternatively be implemented.

FIG. 8 shows a wireless communication unit 110 configured with several commonly implemented components. For instance, the wireless communication unit 110 typically includes one or more components which permits wireless communication between the mobile device 100 and a wireless communication system or network within which the mobile device is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory unit 160.

The mobile communication module 112 transmits/receives wireless signals to/from one or more network entities (e.g., base station, Node-B). Such signals may represent audio, video, multimedia, control signaling, and data, among others.

The wireless Internet module 113 supports Internet access for the mobile device. This module may be internally or externally coupled to the device.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile device. If desired, this module may be implemented using global positioning system (GPS) components which cooperate with associated satellites, network components, and combinations thereof.

Audio/video (A/V) input unit 120 is configured to provide audio or video signal input to the mobile device. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory unit 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a touch screen panel, a jog wheel and a jog switch.

The virtual optical input device according to the present invention can be used as part of the user input unit 130.

The sensing unit 140 provides status measurements of various aspects of the mobile device. For instance, the sensing unit may detect an open/close status of the mobile device, relative positioning of components (e.g., a display and keypad) of the mobile device, a change of position of the mobile device or a component of the mobile device, a presence or absence of user contact with the mobile device, orientation or acceleration/deceleration of the mobile device.

The sensing unit 140 may comprise an inertia sensor for detecting movement or position of the mobile device such as a gyro sensor, an acceleration sensor etc or a distance sensor for detecting or measuring the distance relationship between the user's body and the mobile device.

The interface unit 170 is often implemented to couple the mobile device with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile device. Display 151 is typically implemented to visually display information associated with the mobile device 100. For instance, if the mobile device is operating in a phone call mode, the display will generally provide a user interface or graphical user interface which includes information associated with placing, conducting, and terminating a phone call. As another example, if the mobile device 100 is in a video call mode or a photographing mode, the display 151 may additionally or alternatively display images which are associated with these modes.

A touch screen panel may be mounted upon the display 151. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile device may include one or more of such displays.

FIG. 8 further shows an output unit 150 having an audio output module 152 which supports the audio output requirements of the mobile device 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile device. Typical events include call received, message received and user input received. An example of such output includes the providing of tactile sensations (e.g., vibration) to a user. For instance, the alarm 153 may be configured to vibrate responsive to the mobile device receiving a call or message. As another example, vibration is provided by alarm 153 as a feedback responsive to receiving user input at the mobile device, thus providing a tactile feedback mechanism. It is understood that the various output provided by the components of output unit 150 may be separately performed, or such output may be performed using any combination of such components.

The memory unit 160 is generally used to store various types of data to support the processing, control, and storage requirements of the mobile device. Examples of such data include program instructions for applications operating on the mobile device, contact data, phonebook data, messages, pictures, video, etc. The memory unit 160 shown in FIG. 8 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The control unit 180 typically controls the overall operations of the mobile device. For instance, the controller performs the control and processing associated with voice calls, data communications, video calls, camera operations and recording operations. If desired, the controller may include a multimedia module 181 which provides multimedia playback. The multimedia module may be configured as part of the control unit 180, or this module may be implemented as a separate component.

The power supply unit 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by control unit 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory unit 160), and executed by a controller or processor (for example, control unit 180).

The mobile device 100 of FIG. 8 may be configured to operate within a communication system which transmits data via frames or packets, including both wireless and wired communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 9:
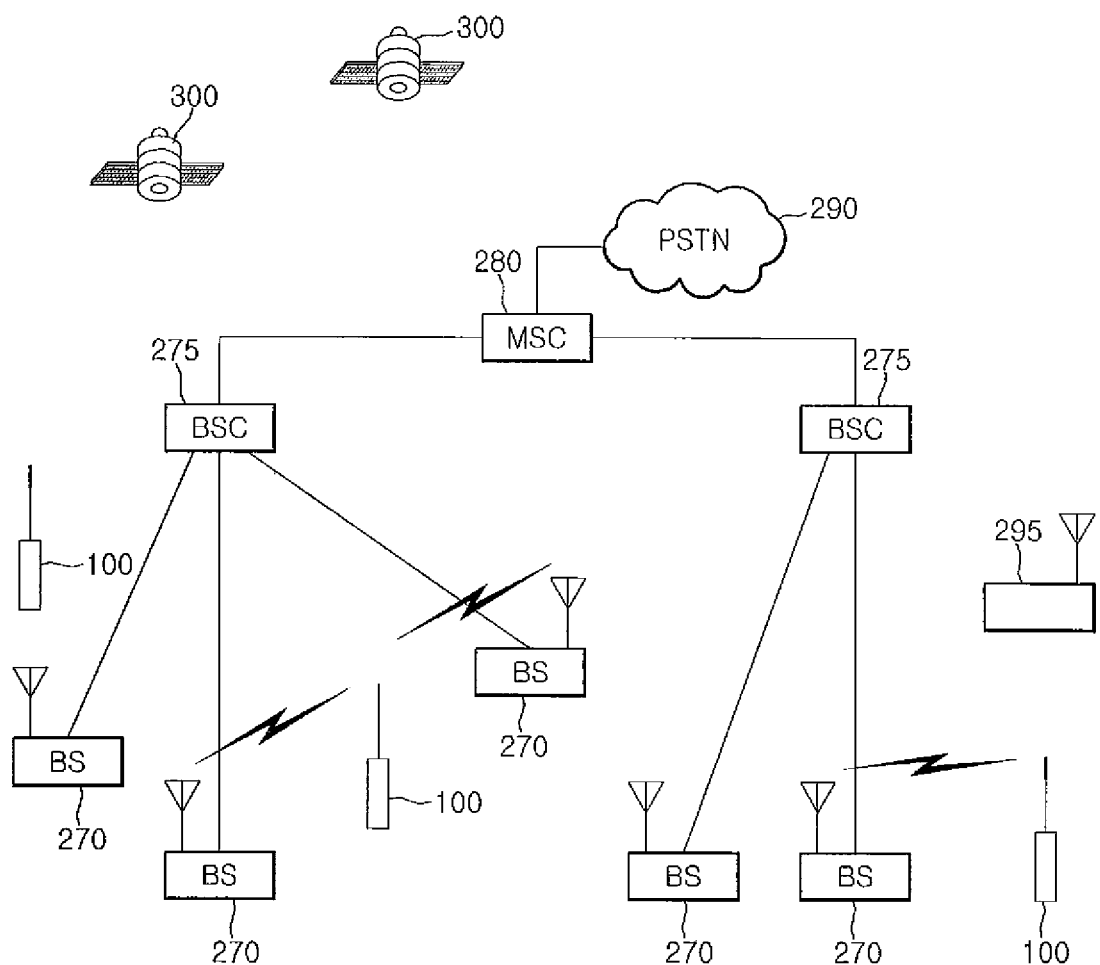
FIG. 9 is a block diagram of a CDMA wireless communication system to which the mobile device of FIG. 8 can be applied.

Referring now to FIG. 9, a CDMA wireless communication system is shown having a plurality of mobile devices 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable/mobile devices 100 operating within the system. The broadcast receiving module 111 (FIG. 8) of the portable device is typically configured to receive broadcast signals transmitted by the DMB transmitter 295. Similar arrangements may be implemented for other types of broadcast and multicast signaling (as discussed above).

FIG. 9 further depicts several global positioning system (GPS) satellites 300. Such satellites facilitate locating the position of some or all of the portable devices 100. Two satellites are depicted, but it is understood that useful positioning information may be obtained with greater or fewer satellites. The position-location module 115 (FIG. 8) of the portable device 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile devices 100. The mobile devices 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile devices 100.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for a mobile device to control a virtual input device, comprising:
    displaying information on a display unit;
    forming a virtual input pattern for detection of user input on an input region of a display plane outside the mobile device by using visible light;
    detecting a distance difference between an input means and an invisible shadow of the input means, wherein the invisible shadow of the input means is generated by an invisible light;
    detecting a relative velocity between the input means and the invisible shadow of the input means;
    determining a contact of the input means on the virtual input pattern based on both the distance difference and when a sign value of the relative velocity between the input means and the invisible shadow changes, wherein the sign value represents a positive value or a negative value; and
    displaying, as a feedback, feedback information on the contact through a projector on a feedback region of the display plane,
    wherein the feedback region is apart from the input region.

2. The method according to claim 1,
    wherein determining the contact comprises:
    capturing an image of the input means on the virtual input pattern;
    calculating a portion of the input means, a portion of the invisible shadow, and the related positions from the captured image; and
    using the calculated position information to determine the contact of the input means.

3. The method according to claim 2, wherein the portion of the input means and the portion of the invisible shadow are respectively an end of the input means and an end of the invisible shadow.

4. The method according to claim 2, wherein the position related to the portion of the input means and the portion of the invisible shadow is a position that is offset by a predetermined distance from the portion of the input means and the portion of the invisible shadow.

5. The method according to claim 1, wherein the virtual input pattern is a keyboard pattern, and the displaying of the feedback comprises displaying an input value, corresponding to a button pressed by the user among the keyboard pattern, on the feedback region of the display plane.

6. The method according to claim 1, wherein the displaying of the feedback comprises displaying the trace of a movement of the input means.

7. The method according to claim 1, wherein the virtual input pattern and the feedback is provided by one imaging device.

8. A virtual input device comprising:
    a display unit displaying information;
    a user input detector configured to:
        generate a virtual input pattern for detection of user input on an input region of a display plane outside a mobile device;
        detect a distance difference between an input means and an invisible shadow of the input means, wherein the invisible shadow of the input means is generated by an invisible light;
        detect a relative velocity between the input means and the invisible shadow of the input means; and
        determine a contact of the input means on the virtual input pattern based on both the distance difference and when a sign value of the relative velocity between the input means and the invisible shadow changes, wherein the sign value represents a positive value or a negative value;
    a projector displaying, as a feedback, feedback information on a contact of a portion of the input means on a feedback region of the display plane, wherein the feedback region is apart from the input region; and
    a controller executing, when a portion of the input means contacts the virtual input pattern, a command corresponding to the contact point and controlling an image processor so that the projector displays the feedback.

9. The virtual input device according to claim 8, wherein the user input detector comprises:
    an input pattern generator generating the virtual input pattern;
    an image receiver capturing the input pattern generated by the input generator, a portion of the input means, and an invisible shadow image corresponding to the portion of the input means; and
    an image processor detecting the positions related to a portion of the input means and a portion of the invisible shadow from the image received by the image receiver.

10. The virtual input device according to claim 9, wherein the input pattern generator comprises:
    a light source;
    a lens condensing light emitted from the light source; and
    a filter passing the light emitted from the lens and having a pattern generating the input pattern.

11. The virtual input device according to claim 8, wherein the feedback is an image.

12. The virtual input device according to claim 8, wherein the virtual input pattern is a keyboard pattern, and the projector displays an input value, corresponding to a button pressed by the user among the keyboard pattern, on a portion of the feedback region of the display plane.

13. The virtual input device according to claim 8, wherein the projector displays a movement trace of the input means on the feedback region of the display plane.

14. The virtual input device according to claim 9, wherein the input pattern generator and the projector comprise one imaging device.

15. The virtual input device according to claim 9, wherein the image receiver is disposed under the input pattern generator such that the image receiver is spaced apart from the input pattern generator by a predetermined distance.

16. The virtual input device according to claim 8, wherein the controller determines the contact of the input means by detecting at least one of the distance, the angle, the relative velocity, and the acceleration between the position related to the portion of the input means and the position related to the portion of the invisible shadow.

17. A mobile device comprising:
- a display unit displaying information;
- a wireless communication unit performing wireless communication with a wireless communication system or another mobile device;
- a user input detector configured to:
  - generate a virtual input pattern for detection of user input on an input region of a display plane outside the mobile device;
  - detect a distance difference between an input means and an invisible shadow of the input means, wherein the invisible shadow of the input means is generated by an invisible light;
  - detect a relative velocity between the input means and the invisible shadow of the input means; and
  - determine a contact of the input means on the virtual input pattern based on both the distance difference and when a sign value of the relative velocity between the input means and the invisible shadow changes, wherein the sign value represents positive value or negative value;
- a projector displaying, as a feedback, feedback information on a contact of a portion of the input means on a feedback region of the display plane, wherein the feedback region is apart from the input region;
- a memory unit storing the input pattern and the corresponding command; and
- a control unit controlling the operations of the above components.

18. The mobile device according to claim 17, wherein the user input detector comprises:
- an input pattern generator generating the virtual input pattern;
- an image receiver capturing the input pattern generated by the input generator, a portion of the input means, and an invisible shadow image corresponding to the portion of the input means; and
- an image processor detecting the position related to a portion of the input means and the position related to a portion of the invisible shadow from the image received by the image receiver.

19. The mobile device according to claim 17, wherein the virtual input pattern is a keyboard pattern, and the projector displays an input value, corresponding to a button pressed by the user among the keyboard pattern, on the feedback region of the display plane.

20. The mobile device according to claim 17, wherein the projector displays a movement trace of the input means on the feedback region of the display plane.

21. The mobile device according to claim 17, wherein the input pattern generator and the projector comprise one imaging device.

22. The method according to claim 1, wherein determining the contact comprises:
- determining the contact based on the distance difference; and
- complementing the contact based on when the sign value of the relative velocity changes.

* * * * *